(12) United States Patent
Zhong

(10) Patent No.: US 11,840,272 B2
(45) Date of Patent: Dec. 12, 2023

(54) FRAME STRUCTURE AND BABY STROLLER

(71) Applicant: WONDERLAND SWITZERLAND AG, Steinhausen (CH)

(72) Inventor: Zhiren Zhong, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 161 days.

(21) Appl. No.: 17/566,160

(22) Filed: Dec. 30, 2021

(65) Prior Publication Data

US 2022/0212708 A1 Jul. 7, 2022

(30) Foreign Application Priority Data

Jan. 4, 2021 (CN) .......................... 202110002312.6

(51) Int. Cl.
*B62B 7/06* (2006.01)
*B62B 7/14* (2006.01)
*B62B 9/20* (2006.01)

(52) U.S. Cl.
CPC ................. *B62B 7/06* (2013.01); *B62B 7/14* (2013.01); *B62B 9/20* (2013.01); *B62B 2205/20* (2013.01)

(58) Field of Classification Search
CPC .... B62B 7/06; B62B 7/14; B62B 9/20; B62B 2205/20
See application file for complete search history.

(56) References Cited

U.S. PATENT DOCUMENTS 10,899,377 B2 * 1/2021 Eggert-Crowe .......... B62B 9/28
10,940,880 B2 * 3/2021 Haut .......................... B62B 9/20
11,203,371 B2 * 12/2021 Zhong ..................... B62B 7/068

FOREIGN PATENT DOCUMENTS

| CN | 103625527 A | 3/2014 |
|---|---|---|
| CN | 204077750 U | 1/2015 |
| CN | 204586977 U | 8/2015 |
| CN | 204688186 U | 10/2015 |
| CN | 107792153 A | 3/2018 |
| CN | 109131517 A | 1/2019 |

(Continued)

OTHER PUBLICATIONS

Taiwan First Office Action issued in corresponding Taiwan Application No. 110148885, dated Jul. 8, 2022, pp. 1-7.

(Continued)

*Primary Examiner* — John D Walters
(74) *Attorney, Agent, or Firm* — HAUPTMAN HAM, LLP

(57) ABSTRACT

A frame structure and a baby stroller are provided. The frame structure includes a hand-gripping part; a front leg pivotally connected with the hand-gripping part; a rear leg pivotally connected with the hand-gripping part; a basket tube including two side rods and a rear rod connected with the two side rods, each of the side rods including a first end and a second end, the first end being pivotally connected to the front leg, and the second end being pivotally connected to the rear leg; a fixing seat slidably disposed on the front leg for connecting the seat bracket to the front leg; a linkage rod having an end pivotally connected to the basket tube, and the other end pivotally connected to the fixing seat. The front leg includes a sliding rail along its longitudinal direction, and the fixing seat includes a sliding groove matched with the sliding rail.

19 Claims, 11 Drawing Sheets

(56) References Cited

FOREIGN PATENT DOCUMENTS

| | | | |
|---|---|---|---|
| CN | 209208837 U | 8/2019 | |
| CN | 110626414 A | * 12/2019 | ............... B62B 7/06 |
| CN | 110626414 A | 12/2019 | |
| CN | 111469906 A | 7/2020 | |
| CN | 211617842 U | 10/2020 | |
| CN | 212220348 U | 12/2020 | |

OTHER PUBLICATIONS

Chinese Search Report issued from corresponding Chinese Application No. 202110002312.6, dated Sep. 10, 2021, pp. 1-13.

* cited by examiner

FRAME STRUCTURE AND BABY STROLLER

TECHNICAL FIELD

The disclosure relates to a frame structure and a baby stroller including the same.

BACKGROUND

The baby stroller is provided to release the user's hands so as to alleviate the fatigue caused by holding a baby for a long time, and improves the comfort of the user. In addition, in order to facilitate carrying the baby stroller when going out, the baby stroller is usually foldable, and a main structure of the frame may be folded and retracted to reduce its volume and facilitate to be carried.

For example, a frame folding linkage mechanism is disclosed, in which, three points connection lines, i.e., the connection lines of a pivot point of a front stand and a rear stand, a pivot point of a basket tube and the rear stand, and a clamping point of the front stand of the basket tube, constitute a triangular structure, and with this stable triangular structure, a unfolded state of the frame of the baby stroller is stably kept. An engaging portion for engaging with the front stand is provided inside each of two side tubes of the basket tube, and an unlocking structure for driving the engaging portion to be detached from the front stand is provided inside the basket tube. An operating portion for controlling the unlocking structure is provided at a side of the basket tube away from the front stand, and the operating portion is located on the U-shaped bottom of the basket tube, so that the user can conveniently drive the operating portion to control ends of the two side tubes of the basket tube to be disengaged from the front stand, thereby realizing the folding of the frame.

For another example, when a folding baby stroller in an unfolded state is required to be folded, an upper enclosing rod is turned forwards and downwards to close to a pushing rod. Then, the pushing rod and the upper enclosing rod are turned rearwards and downwards. The upper enclosing rod, a side support rod, a sliding sleeve and a rear bracket constitute a crank-slider mechanism. During the upper enclosing rod is turned and closes to the rear bracket, an upper portion of the side support rod is brought to be turned rearwards, and the sliding sleeve moves upwards along the side support rod. The side support rod, the rear bracket, a basket rod and a sliding groove constitute another crank-slider mechanism. During a lower portion of the side support rod is turned forwards, the basket rod is pried to be turned, and a pin shaft connected to the lower portion of the side support rod slides forwards along the sliding groove. A front bracket, a rear bracket, a seat rod, and the basket rod constitute a four-bar linkage mechanism. A front portion of the basket rod brings a rear portion to be turned upwards, so that the front bracket and the rear bracket are turned and move closer to each other. The front bracket, the seat rod, a connecting rod, and an armrest constitute another four-bar linkage mechanism. The seat rod is turned so that the armrest and the connecting rod are turned and move towards the front bracket. After all of components are folded, the folding of the entire stroller is completed.

When the folding baby stroller in a reverse state is required to be folded, the push rod is turned rearwards firstly so that the folding baby stroller is switched to the unfolded state, and then the folding is performed according to the above steps.

BRIEF DESCRIPTION OF THE DRAWINGS

The accompanying drawings are included herein to provide a further understanding of the present invention, and are incorporated into this specification to constitute a part of this specification. The accompanying drawings illustrate embodiments of the present invention and are used together with the following description to explain a concept of the present invention.

In the drawings.

Figure 1:
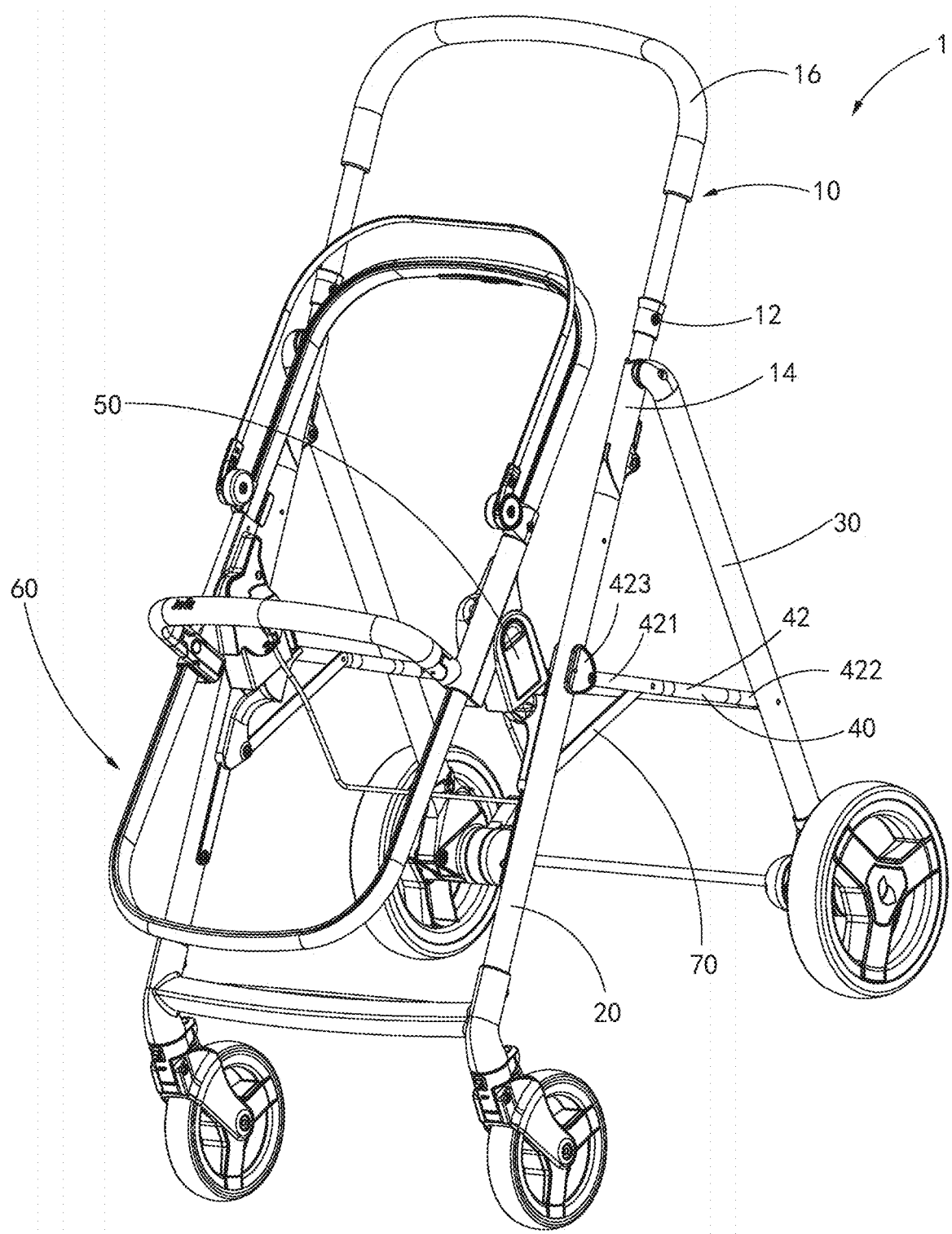
FIG. 1 is a schematic view of a baby stroller according to the disclosure, showing that a seat portion is engaged forwards.

In the drawings:
1 frame structure
10 hand-gripping part
12 retracting handle
14 folding joint
16 sleeve tube
20 front leg
22 sliding rail
30 rear leg
40 basket tube
42 side rod
421 first end
422 second end
423 connecting mount
44 rear rod
50 fixing seat
52 sliding groove
54 connecting pole
60 seat bracket
70 linkage rod

DETAILED DESCRIPTION

Hereinafter, exemplary embodiments will be described in detail with reference to the accompanying drawings. Although the present disclosure is susceptible to various modifications and alternative forms, its specific embodiments are shown by way of example in the accompanying drawings. However, the present disclosure should not be construed as being limited to the embodiments set forth herein, and instead, the present disclosure will cover all modifications, equivalents, and alternatives falling within the spirit and scope of the embodiments.

In the frame folding linkage mechanism of the related art, it is usually necessary to provide an engaging portion, an unlocking portion and an operating portion, causing a complex overall structure, and thereby increasing the manufacturing cost and the failure rate. Furthermore, the folding and deploying operation of the folding baby stroller of the prior art is complicated and inconvenient.

The disclosure mainly relates to various baby strollers including, but not being limited to baby carrier, children's umbrella handle car, or the like. The baby stroller according to the disclosure can be easily folded and unfolded, and has a simple structure.

Figure 2:
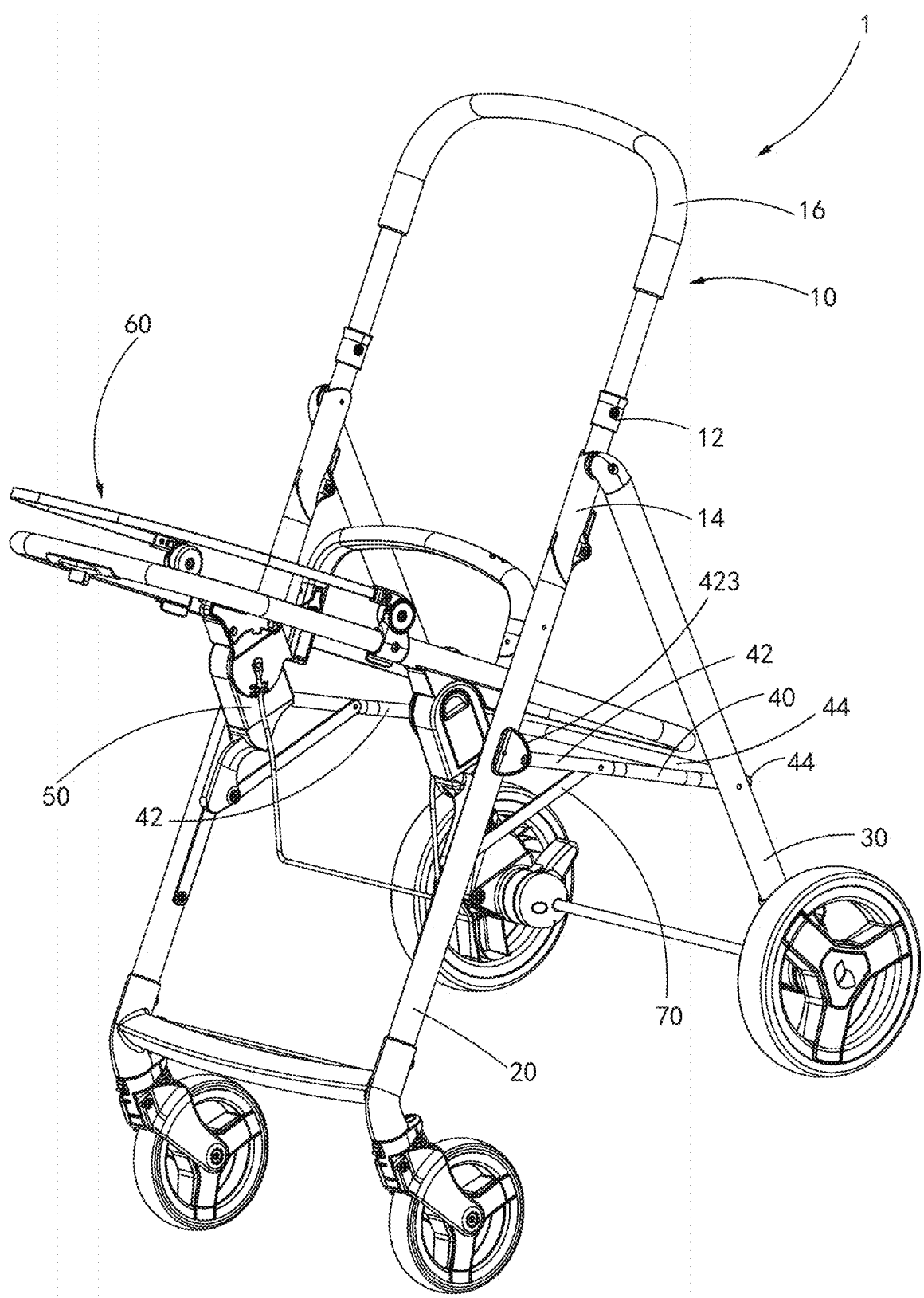
FIG. 2 is a schematic view of the baby stroller according to the disclosure, showing that the seat portion is engaged rearwards.
Figure 3:
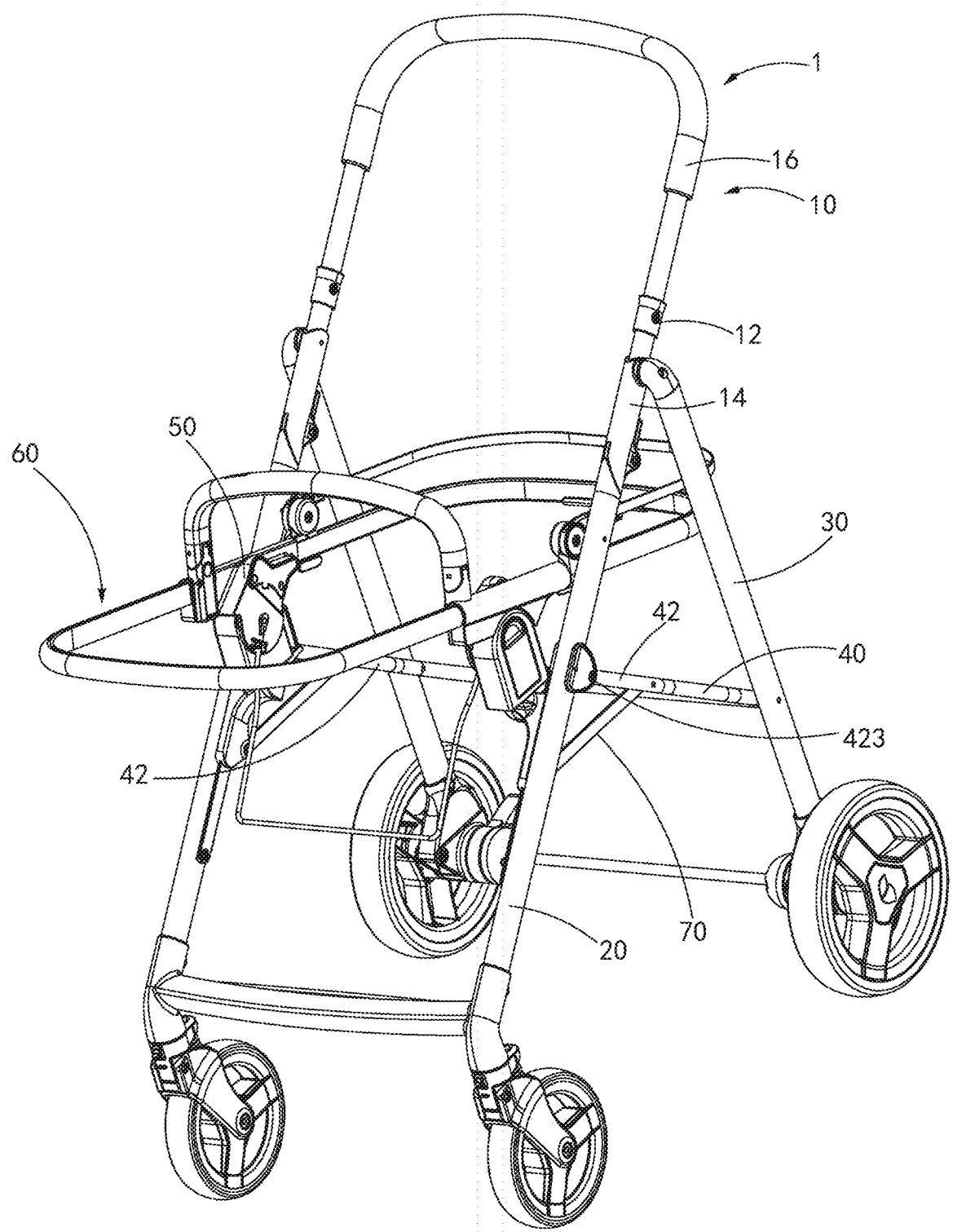
FIG. 3 is a schematic view of the baby stroller according to the disclosure, showing a state in which the seat portion is transformed into a sleeping box.

Hereinafter, the baby stroller of the disclosure, and in particular, a frame structure 1 of the baby stroller will be described in detail with reference to the accompanying drawings. Firstly, the description will be made with reference to FIGS. 1-3, in which FIG. 1 is a schematic view of a baby stroller according to the disclosure showing that a seat portion is engaged forwards; FIG. 2 is a schematic view of a baby stroller according to the disclosure showing that the seat portion is engaged rearwards; and FIG. 3 is a schematic view of a baby stroller according to the disclosure showing a state in which the seat portion is transformed into a sleeping box. The frame structure 1 according to the disclosure mainly includes a hand-gripping part 10, a front leg 20, a rear leg 30, and a basket tube 40. The hand-gripping part 10 may be used as a handle for pushing the baby stroller to move. Thus, according to a preferred embodiment of the disclosure, the hand-gripping part 10 includes a sleeve tube 16, which facilitates an operator of the baby stroller to grip by hand. The hand-gripping part 10 further includes a retracting handle 12 and a folding joint 14, and the hand-gripping part 10 and the front leg 20 are pivoted through the folding joint 14. The locking state between the hand-gripping part 10 and the front leg 20 is unlocked by pulling the retracting handle 12, so that the folding joint 14 may be folded, and the rear leg 30 is folded with respect to the front leg 20.

The front leg 20 and the rear leg 30 are both pivotally connected with the hand-gripping part 10, and the front leg 20 and the rear leg 30 are in a V-shape as a whole when they are unfolded. The basket tube 40 includes two side rods 42 and a rear rod 44 connected to both side rods 42. The two side rods 42 and the rear rod 44 are respectively arranged on left, right and rear sides of the frame structure, so that the basket tube 40 is in a U-shape as a whole. A storage basket (not shown) may be attached on the basket tube 40 to facilitate carrying items that a child may be used. Viewed from the side, such as a right side shown in FIG. 1, one of the side rods 42 of the basket tube 40 includes a first end 421 and a second end 422. The first end 421 is pivotally connected to the front leg 20, and the second end 422 is pivotally connected to the rear leg 30. Similarly, the other side rod 42 of the basket tube 40 also includes a first end 421 and a second end 422 respectively pivotally connected to the front leg 20 and the rear leg 30. In this way, both ends of the rear rod 44 of the basket tube 40 are pivotally connected to the rear leg 30. According to a preferred embodiment of the disclosure, the two side rods 42 and the rear rod 44 of the basket tube 40 are integrally formed, so that the basket tube 40 is in a U-shape as a whole. The basket tube 40 further includes a connecting mount 423, and the first end 421 of each of the two side rods 42 of the basket tube 40 is pivotally connected to the front leg 20 through the connecting mount 423.

The frame structure 1 according to the disclosure further includes a fixing seat 50. The fixing seat 50 is slidably disposed on the front leg 20, that is, the fixing seat 50 may slide up and down along the front leg 20. The fixing seat 50 is to connect the seat bracket 60 to the front leg 20. The seat bracket 60 forms a seat portion for a child to sit thereon. For example, the seat portion may be engaged forwards and rearwards as shown in FIGS. 1 and 2. The seat portion may also be transformed into a carrycot structure that is parallel to the ground, for a little baby. According to one embodiment of the disclosure, the fixing seat 50 includes a connecting pole 54 (shown in FIG. 5), and the seat bracket 60 may be connected to the fixing seat 50 through the connecting pole 54.

In addition, the frame structure 1 according to the disclosure is further includes a linkage rod 70. An end of the linkage rod 70 is pivotally connected to the basket tube 40, and the other end is pivotally connected to the fixing seat 50. According to one embodiment of the disclosure, the linkage rod 70 is a linkage iron sheet. The linkage rod 70, the front leg 20 and the basket tube 40 form a triangular structure in the unfolded state. In addition, the front leg 20, the basket tube 40 and the rear leg 30 also form a triangular structure in the unfolded state, so that the entire frame structure 1 can be firmly supported in the unfolded state.

Figure 4:
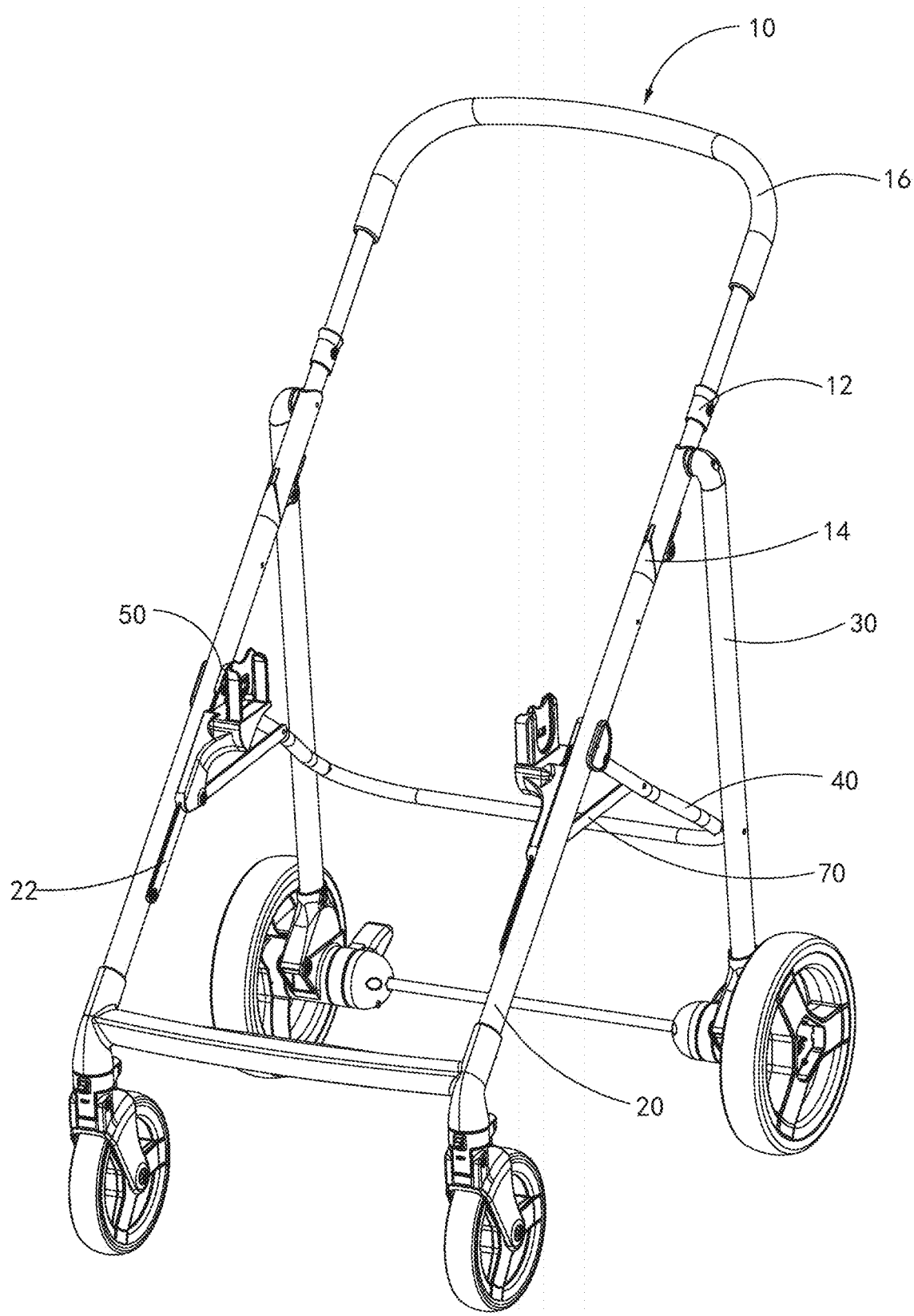
FIG. 4 is a schematic view of a frame structure according to the disclosure, in which the seat portion has been detached.
Figure 5:
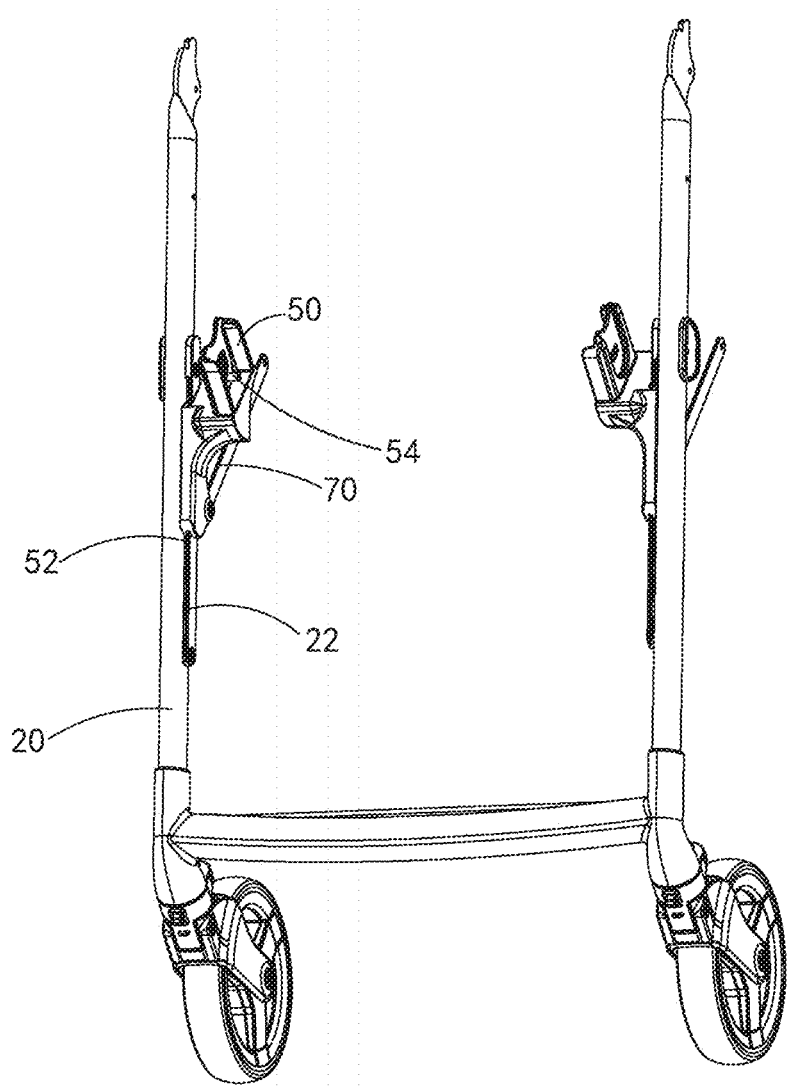
FIG. 5 is a schematic view specifically showing a connection structure of a fixing seat, a front leg, and a linkage rod of the frame structure according to the disclosure.

FIG. 4 shows the frame structure 1 according to the disclosure more clearly, in which the seat portion has been detached. With further reference to FIG. 5, FIG. 5 is a schematic view specifically showing a connection structure of a fixing seat 50, a front leg 20, and a linkage rod 70 of the frame structure according to the disclosure. The frame structure 1 according to the disclosure includes: two front legs 20 and two rear legs 30 respectively arranged symmetrically in a left-right direction; two fixing seats 50 respectively connected to the two front legs 20; and two linkage rods 70 respectively connected between the two front legs 20 and the basket tube 40. The hand-gripping part 10 includes two retracting handles 12 and two folding joints 14 respectively connected to the two front legs 20. The hand-gripping part 10 may be in a U-shape as a whole to form a handle portion for the operator to hold. Of course, the hand-gripping part 10 may also be formed into two handle portions respectively connected with the two retracting handles 12 and the two folding joints 14.

According to the disclosure, the front leg 20 includes a sliding rail 22 along its longitudinal direction, and the fixing seat 50 includes a sliding groove 52 matched with the sliding rail 22. In this way, the sliding rail 22 and the sliding groove 52 are matched so that the fixing seat 50 may slide up and down within a certain range along the front leg 20. According to another embodiment of the disclosure, the front leg 20 includes a sliding groove along its longitudinal direction, and the fixing seat 50 includes a sliding block matched with the sliding rail 22. Similarly, the sliding block and the sliding groove are matched so that the fixing seat 50 may slide up and down within a certain range along the front leg 20.

Figure 6:
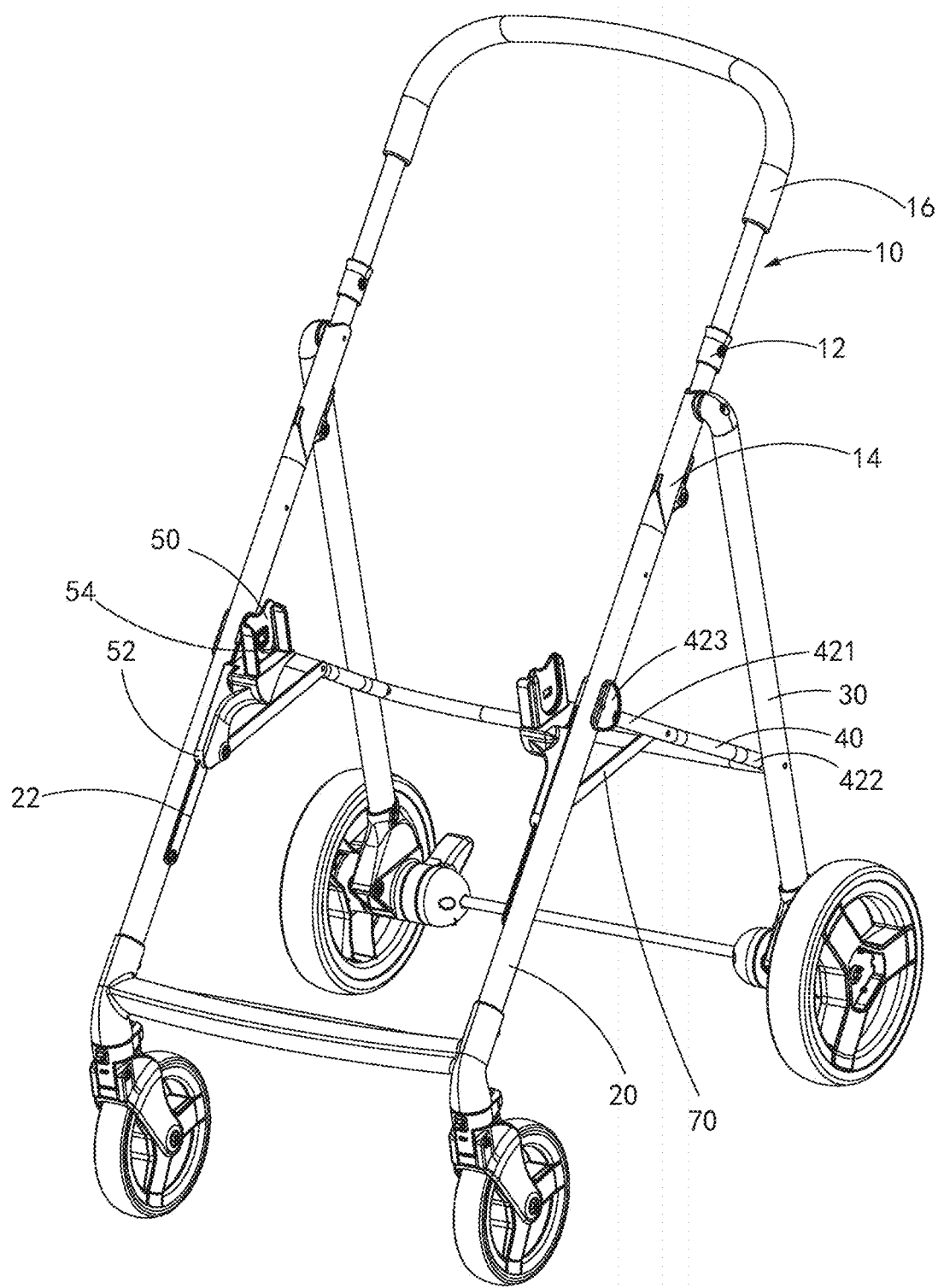
FIG. 6 is a schematic view of the frame structure according to the disclosure, showing that the frame structure is in an unfolded state.
Figure 7:
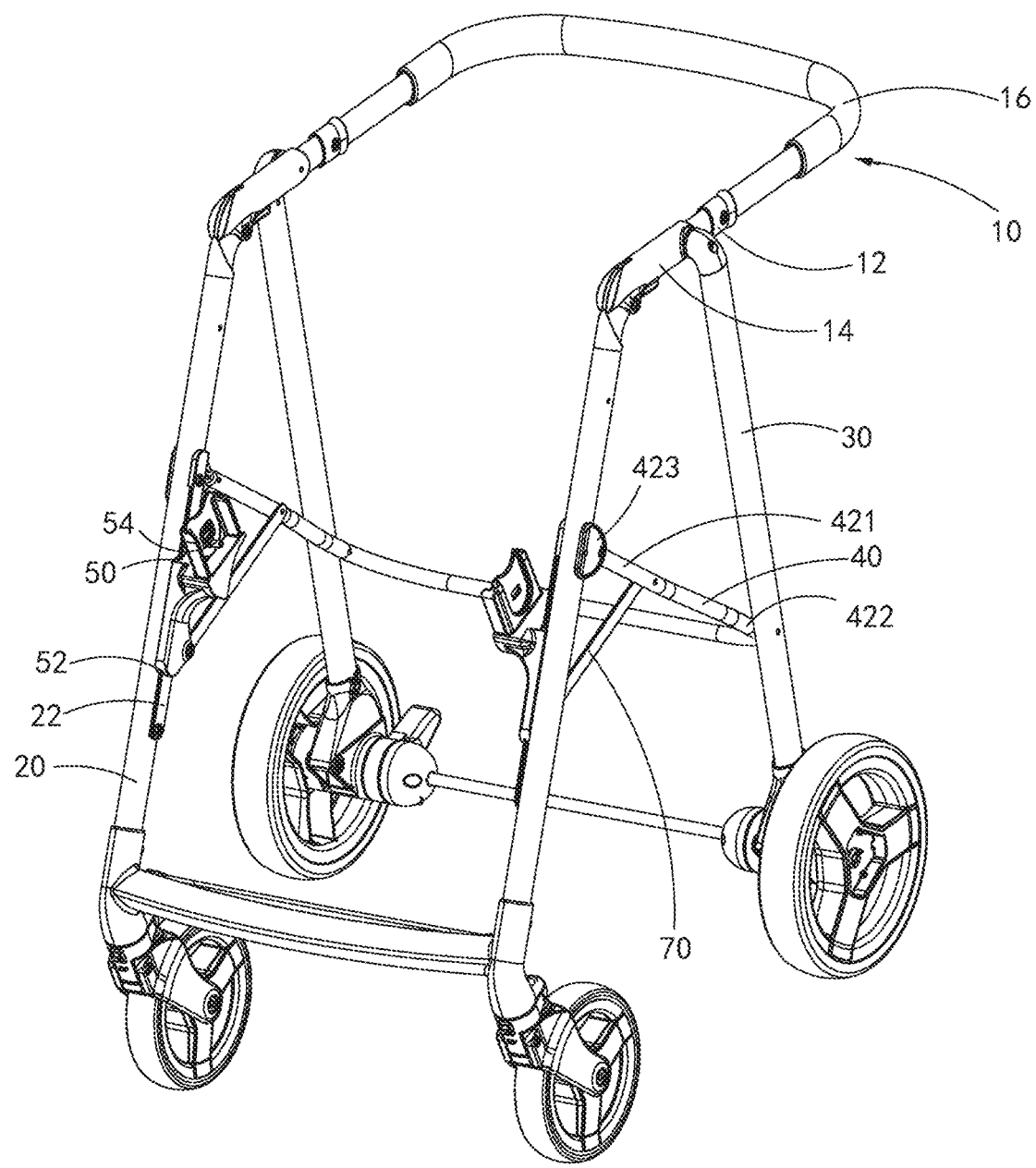
FIG. 7 is a schematic view of the frame structure according to the disclosure, showing that the frame structure is in a half-folded state.
Figure 8:
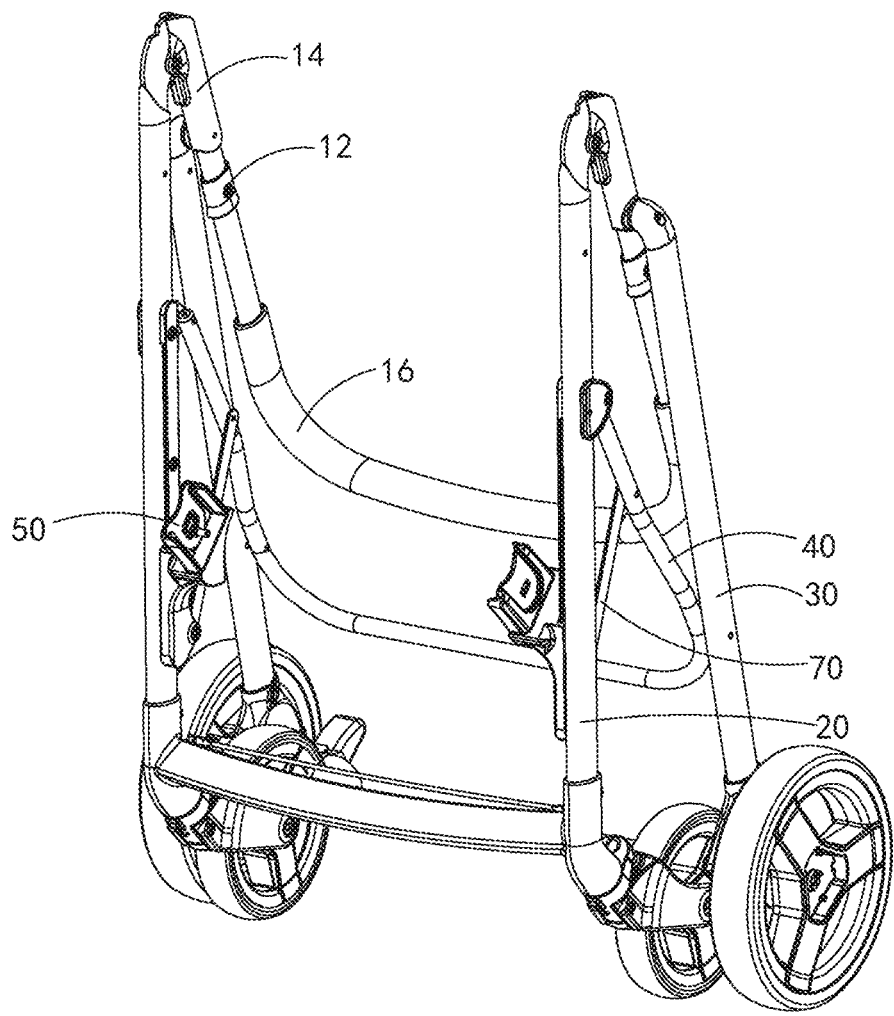
FIG. 8 is a schematic view of the frame structure according to the disclosure, showing that the frame structure is in a fully folded state.

A folding process of the frame structure 1 according to the disclosure will be described below with reference to FIGS. 6-8. FIG. 6 is a schematic view of the frame structure 1 according to the disclosure, showing that frame structure 1 is in an unfolded state; FIG. 7 is a schematic view of the frame structure according to the disclosure, showing that the frame structure is in a half-folded state; and FIG. 8 is a schematic view of the frame structure according to the disclosure, showing that the frame structure is in a fully folded state. When the folding is started, the retracting handle 12 is manipulated to unlock the locking state between the hand-gripping part 10 and the front leg 20, so that the folding joint 14 begins to be bent. As the folding joint 14 is further bent, the rear leg 30 starts to be folded or retracted with relative to the front leg 20. At this time, the fixing seat 50 starts to slide down along the sliding rail 22 of the front leg 20, the linkage rod 70 and the basket tube 40 are pivoted along therewith, and finally, the front leg 20 and the rear leg 30 are fully folded or retracted.

Figure 9:
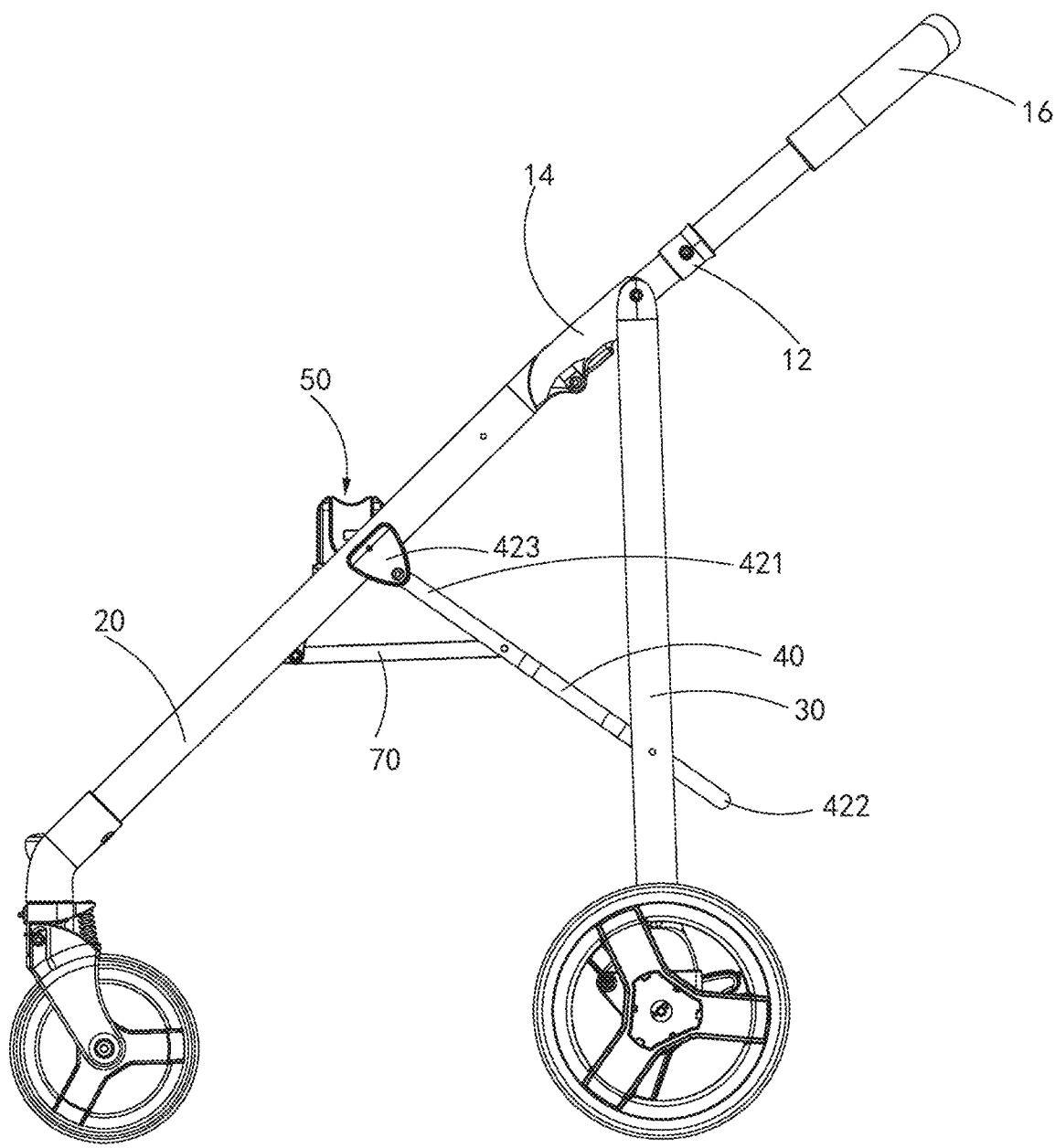
FIG. 9 is a side schematic view of the frame structure according to the disclosure, showing that the frame structure is in the unfolded state.
Figure 10:
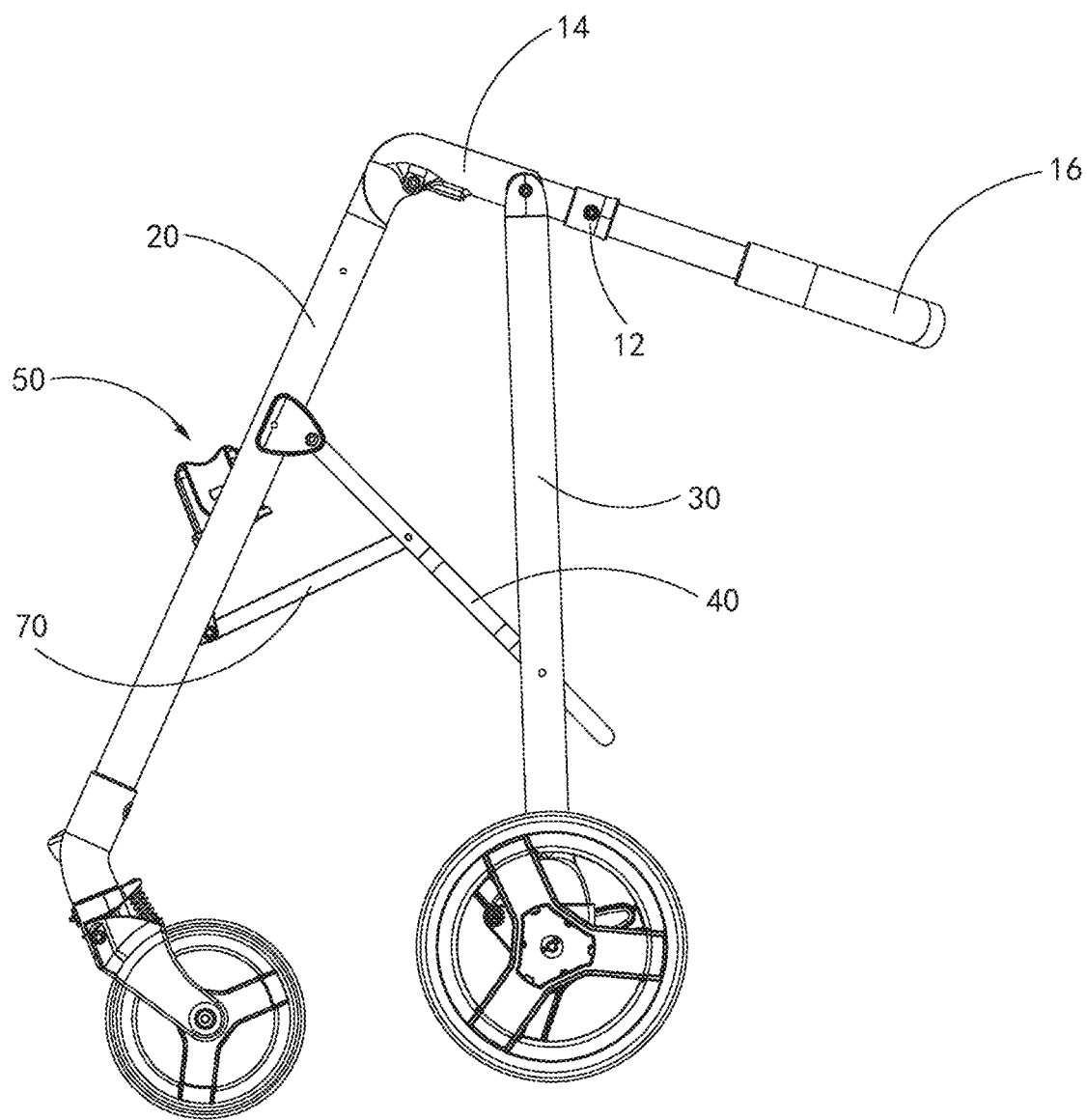
FIG. 10 is a side schematic view of the frame structure according to the disclosure, showing that the frame structure is in the half-folded state.
Figure 11:
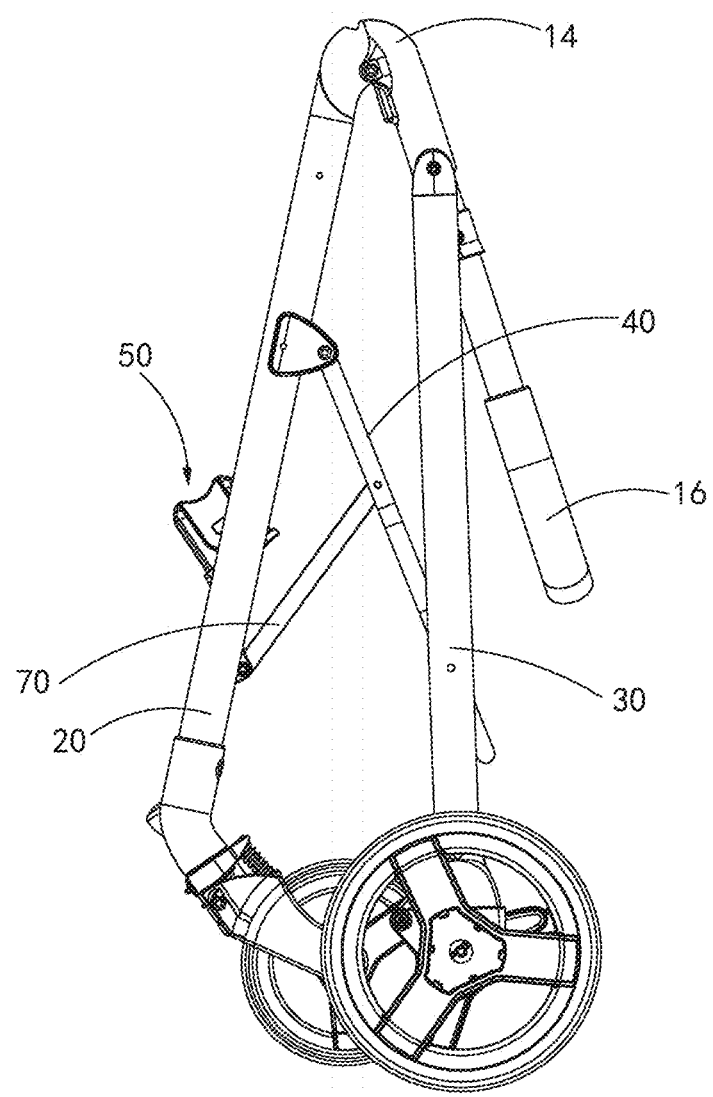
FIG. 11 is a side schematic view of the frame structure according to the disclosure, showing that the frame structure is in the fully folded state.

FIGS. 9-11 shows the folding process of the frame structure 1 according to the disclosure in side views. As shown in FIG. 9, in the unfolded state of the frame structure 1, the linkage rod 70, the front leg 20 and the basket tube 40 form a triangular structure. In addition, the front leg 20, the basket tube 40, and the rear leg 30 also form a triangular structure, thereby ensuring the stability of the frame structure 1 in the unfolded state. As shown in FIGS. 10 and 11, during the folding process, since the folding joint 14 starts to be bent, the triangular structure formed by the front leg 20, the basket tube 40 and the rear leg 30 deforms. At this time, two parts of the folding joint 14 are bent with each other so as to form a four-bar linkage structure together with the front leg 20 and the rear leg 30. The hand-gripping part 10 is further pressed, so that the four-bar linkage structure is further deformed, and finally the front leg 20 and the rear leg 30 are fully folded or retracted.

Specifically, in the frame structure 1 according to the disclosure, and in addition to the folding at the folding joint 14, the fixing seat 50 also slides down along the sliding rail 22 of the front leg 20, and brings the linkage rod 70 and the basket tube 40 to be pivoted and folded. Therefore, compared to the situation that the folding or retracting process can be performed only at the folding joint 14, a distance between the front leg 20 and the rear leg 30 is further reduced, thereby enabling the folding to be more sufficient, and thus further reducing a volume after folded.

The frame structure 1 and the baby stroller according to the disclosure have simple structure, low manufacturing cost and failure rate, and the folding and unfolding operations of the frame structure are easy and convenient.

Since the features of the present invention can be embodied in various forms without departing from the characteristics of the present invention, it should also be understood that the above-mentioned embodiments are not limited to any details described above, unless otherwise noted, and should be broadly interpreted as falling within the scope defined by the appended claims. Therefore, all modifications and alterations falling within the scope and limit of the claims or equivalent solutions of such scope and limit shall be covered by the appended claims.

What is claimed is:

1. A frame structure (1) comprising:
a hand-gripping part (10);
a front leg (20) pivotally connected with the hand-gripping part (10);
a rear leg (30) pivotally connected with the hand-gripping part (10);
a basket tube (40) comprising two side rods (42) and a rear rod (44) connected with the two side rods (42), each of the two side rods (42) comprising a first end (421) and a second end (422) that are opposite to each other, the first end (421) being pivotally connected to the front leg (20), and the second end (422) being pivotally connected to the rear leg (30);
a fixing seat (50) slidably disposed on the front leg (20) for connecting the seat bracket (60) to the front leg (20); and
a linkage rod (70) having an end pivotally connected to the basket tube (40), and the other end pivotally connected to the fixing seat (50),
wherein the front leg (20) comprises a sliding rail (22) along its longitudinal direction, and the fixing seat (50) comprises a sliding groove (52) matched with the sliding rail (22), so that the fixing seat (50) slides along the sliding rail (22).

2. The frame structure (1) according to claim 1, wherein the hand-gripping part (10) comprises a retracting handle (12) for unlocking the locking state between the hand-gripping part (10) and the front leg (20).

3. The frame structure (1) according to claim 1, wherein the hand-gripping part (10) comprises a folding joint (14), and both the front leg (20) and the rear leg (30) are pivotally connected to the folding joint (14).

4. The frame structure (1) according to claim 1, wherein the fixing seat (50) comprises a connecting pole (54) for connecting with the seat bracket (60).

5. The frame structure (1) according to claim 1, wherein the linkage rod (70) is a connecting iron sheet.

6. The frame structure (1) according to claim 1, wherein the hand-gripping part (10) comprises a sleeve tube (16) for facilitating an operator to grip.

7. The frame structure (1) according to claim 1, wherein the basket tube (40) further comprises a connecting mount (423), and the first end (421) of each of the two side rods (42) is pivotally connected to the front leg (20) through the connecting mount (423).

8. The frame structure (1) according to claim 1, wherein the two side rods (42) and the rear rod (44) of the basket tube (40) are integrally formed, so that the basket tube (40) is in a U-shape as a whole.

9. The frame structure (1) according to claim 1, wherein the frame structure (1) comprises:
two front legs (20) and two rear legs (30) respectively arranged symmetrically in a left-right direction;
two fixing seats (50) respectively connected to the two front legs (20); and
two linkage rods (70) respectively connected between the two front legs (20) and the basket tube (40), wherein the hand-gripping part (10) comprises two retracting handles (12) and two folding joints (14) respectively connected to the two front legs (20).

10. A baby stroller comprising the frame structure (1) according to claim 1.

11. A frame structure (1) comprising
a hand-gripping part (10);
a front leg (20) pivotally connected with the hand-gripping part (10);
a rear leg (30) pivotally connected with the hand-gripping part (10);
a basket tube (40) comprising two side rods (42) and a rear rod (44) connected with the two side rods (42), each of the two side rods (42) comprising a first end (421) and a second end (422) that are opposite to each other, the first end (421) being pivotally connected to the front leg (20), and the second end (422) being pivotally connected to the rear leg (30);

a fixing seat (50) slidably disposed on the front leg (20) for connecting the seat bracket (60) to the front leg (20); and a linkage rod (70) having an end pivotally connected to the basket tube (40), and the other end pivotally connected to the fixing seat (50), wherein the front leg (20) comprises a sliding groove along its longitudinal direction, and the fixing seat (50) comprises a sliding block matched with the sliding groove, so that the fixing seat (50) slides along the sliding groove.

12. The frame structure (1) according to claim 10, wherein the hand-gripping part (10) comprises a retracting handle (12) for unlocking the locking state between the hand-gripping part (10) and the front leg (20).

13. The frame structure (1) according to claim 10, wherein the hand-gripping part (10) comprises a folding joint (14), and both the front leg (20) and the rear leg (30) are pivotally connected to the folding joint (14).

14. The frame structure (1) according to claim 10, wherein the fixing seat (50) comprises a connecting pole (54) for connecting with the seat bracket (60).

15. The frame structure (1) according to claim 10, wherein the linkage rod (70) is a connecting iron sheet.

16. The frame structure (1) according to claim 10, wherein the hand-gripping part (10) comprises a sleeve tube (16) for facilitating an operator to grip.

17. The frame structure (1) according to claim 10, wherein the basket tube (40) further comprises a connecting mount (423), and the first end (421) of each of the two side rods (42) is pivotally connected to the front leg (20) through the connecting mount (423).

18. The frame structure (1) according to claim 10, wherein the two side rods (42) and the rear rod (44) of the basket tube (40) are integrally formed, so that the basket tube (40) is in a U-shape as a whole.

19. The frame structure (1) according to claim 10, wherein the frame structure (1) comprises:

two front legs (20) and two rear legs (30) respectively arranged symmetrically in a left-right direction;

two fixing seats (50) respectively connected to the two front legs (20); and two linkage rods (70) respectively connected between the two front legs (20) and the basket tube (40), wherein the hand-gripping part (10) comprises two retracting handles (12) and two folding joints (14) respectively connected to the two front legs (20).

* * * * *